Sept. 25, 1962   M. DELASSUS ET AL   3,055,732
PROCESS FOR REMOVING OXYGEN, CARBON MONOXIDE, CARBON
DIOXIDE AND WATER
Filed July 18, 1960
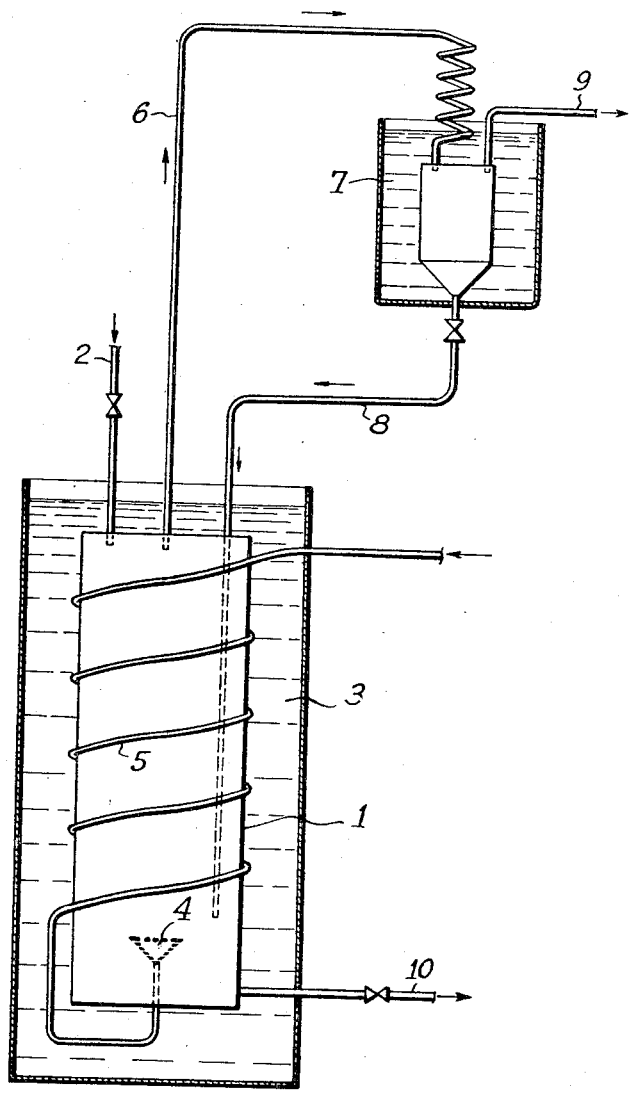

United States Patent Office 3,055,732
Patented Sept. 25, 1962

3,055,732
PROCESS FOR REMOVING OXYGEN, CARBON MONOXIDE, CARBON DIOXIDE, AND WATER
Marcel Delassus, Mazingarbe, Bernard Lefrancois, Noeux-les-Mines, and Christian Vaniscotte, Vermelles, France, assignors to Houilleres du Bassin du Nord et du Pas-de-Calais, Douai, France, a French public establishment and Commissariat a l'Energie Atomique, Paris, France
Filed July 18, 1960, Ser. No. 43,546
Claims priority, application France July 18, 1959
7 Claims. (Cl. 23—2)

In the course of research work done in recent years it has constantly been found that in the majority of techniques requiring the use of gaseous reagents, whether these are in the form of simple or compound substances or of more or less complex mixtures, it was advantageous, if not indispensable, for these reagents to be as free as possible of foreign constituents or impurities.

Thus, for the purposes of ammonia synthesis, it is very advantageous to purify very carefully the mixture of nitrogen and hydrogen, because the impurities which it contains have the effect of reducing the life of the synthesis catalyst. The impurities referred to in this case are essentially oxygen, carbon monoxide, carbon dioxide, and water.

Similarly with a view to the polymerisation of ethylene by the radical method at high pressure, it is likewise indispensable to eliminate from the ethylene all traces of foreign gases, because the slightest traces of oxygen and carbon monoxide have the consequence of profoundly modifying the quality of the polyethylene obtained; moreover, the presence of oxygen to a substantial degree also incurs the risk of imparting an explosive character to this polymerisation under pressure.

With a view to obviating certain of these disadvantages, it has already been attempted to utilise for example processes of elimination of oxygen from gaseous mixtures, entailing either a catalytic reaction with hydrogen, with the formation of water which is eliminated by passage over an adsorbent substance such as sodium silico-aluminate, or a chemical reaction with $CaH_2$. Nevertheless, such processes are not satisfactory, either because they do not make it possible to eliminate simultaneously all the impurities, or because there is a risk of affecting a useful constituent at the same time. Thus the formation of water is harmful in the case of the purification of gases intended to participtate in certain catalytic reactions taking place in an anhydrous medium, the catalyst being sensitive to water; conversely, the use of $CaH_2$ has the consequence of eliminating nitrogen from the gas treated.

Disadvantages of the same type are encountered in known processes for the elimination of other types of impurities.

The present invention makes it possible to avoid all these disadvantages and to eliminate simultaneously, under advantageous economic conditions and with remarkable effectiveness, all the aforesaid harmful impurities in a gas or gaseous mixture.

In its most general aspect, this process consists in bringing the gas or gaseous mixture to be purified into contact with at least one alkali metal amide in a liquid ammonium medium.

The aforesaid impurities then react in accordance with equations such as:

for oxygen;

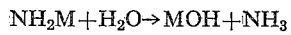

for water; and similar equations for CO and $CO_2$. (M representing 1 atom of alkali metal.)

The alkali metal amides utilisable according to the invention are essentially sodium amide and potassium amide, the respective efficiencies of which are only slightly different. On the other hand, for certain applications, sodium amide may give rise to certain problems because it is utilisable only partially in solution and partially in suspension in liquid ammonia, whereas potassium amide is entirely dissolved in the liquid ammonia, at the effective concentrations used according to the invention. It is however possible to render sodium amide more soluble by the addition of a salt, for example sodium chloride.

These effective concentrations are relatively low, whether the amide is in solution and/or in suspension in the ammonia. In practice, for a satisfactory purification, that is to say effecting an elimination of the impurities to a content lower than the accuracy of the methods of analysis used, the concentrations must not be lower than about 0.2% by weight of amide in relation to liquid ammonia. On the other hand higher concentrations than 4% do not provide substantial advantages having regard to the corresponding increase in expense.

Moreover it is obvious that the use of a solution of amide in liquid ammonia makes it necessary to work under conditions of temperature and pressure ensuring the maintenance of this liquid state. However the relative influence of temperature alone is relatively low, the effectiveness of purification varying by only about 15% between —50° C. and +20° C. In practice, it will be possible to operate in the range from —70 to +100° C., preferably from —50 to +50° C. There will naturally be a limit imposed in the downward direction by the temperature of solidification of ammonia, i.e. —78° C. and in the upward direction by the critical temperature, namely +124° C. On the other hand, the influence of pressure is very substantial, the efficiency increasing with the pressure from zero efficiency at atmospheric pressure up to 80% at 100 atmospheres and 100% at 500 atmospheres. In practice therefore operations will be carried out at a pressure varying within the range of 50–500 atmospheres and preferably at about 100 atmospheres.

Finally the efficiency of the purification method according to the invention is affected by the manner in which the gaseous mixture to be purified is brought into contact with the ammoniacal solution of amide. In practice, this contact will result from a dispersion of the gaseous mixture in the ammoniacal solution, and experience has shown that the greater the dispersion, the higher the efficiency. To this end it is possible to use a porous plate of fritted metal or any other system of intimate contact between a gas and a liquid.

The invention also relates to an apparatus for carrying out this process, which comprises a purification tower, at the top of which is introduced the solution and/or suspension of alkali amide in liquid ammonia, and at the base of which is disposed a dispersive introduction system for the gas to be purified, an outlet for the gas at the top of the said tower being connected to a condenser device intended to recover any ammonia which may be entrained by the gas, for the purpose of returning it to the tower before evacuation of the purified gas.

The tower is advantageously itself maintained at a temperature effecting the maintenance of the liquid ammonia at the necessary temperature, the gaseous mixture before introduction at the base of the tower advantageously itself undergoing preliminary cooling in the same bath.

It will be noted that in order to recover effectively the ammonia contained by the purified gaseous mixture, the condenser system must have a temperature of about —70° C.

This apparatus is illustrated in the single FIGURE of the accompanying drawing.

In this drawing, 1 designates the high-pressure purifier tower, at the top of which is introduced, through a pipe 2, the solution and/or suspension of alkali amide. This tower is placed in a bath 3 maintained at a temperature ensuring the desired temperature for the purifying mixture.

A dispersing system 4 is placed in the bottom of the tower for the introduction of the gaseous mixture to be purified, which in a circuit 5 remains in the bath 3 during a preliminary period for the purpose of reaching the purification temperature. The purified gas leaves at the top of the tower through a pipe 6 and passes through a bath 7 cooled to about −70° C. for the purpose of the recovery of any ammonia which may be entrained, which is returned to the tower 1 through a pipe 8, while the gaseous mixture, purified and freed from ammonia, is recovered through a pipe 9. Finally, a pipe 10 permits withdrawal at the base of the tower of the ammonia charged with purification medium which may be exhausted, as well as the products resulting from the purification reaction.

As will be seen from the examples below, this process and this apparatus make it possible to eliminate from a gas or gaseous mixture all the harmful impurities, particularly oxygen, carbon monoxide, carbon dioxide, and water. The control of this purification is based on the dosage of the oxygen by the Hersch apparatus (accuracy 0.5 part per million), and the dosage of the carbon monoxide and carbon dioxide by the Wösthoff apparatus (accuracy 1 part per million), the dosage of the water by the increase in weight of a tube of potassium perchlorate.

EXAMPLE 1

Elimination of oxygen and carbon monoxide from ethylene intended for the synthesis of polyethylene.

Ethylene coming from the liquefaction of coke-oven gas and containing as impurities:

Parts per million
$O_2$ ---------------------------------------- 18
$CO$ ---------------------------------------- 40 is compressed to 500 kg. per sq. cm.

This compressed gas is introduced through a metal plate perforated with holes of a diameter of 4 mm. at the base of a tubular reactor of the type illustrated in the drawing and containing a solution of 3% by weight of potassium amide in liquid ammonia, maintained at a temperature of −20° C. The height of the liquid layer above the dispersing plate is 1 m. and the contact between the gas and the liquid is further improved by rotation at high speed (1,500 r.p.m.) of a screw agitator disposed at a distance of 50 mm. from the perforated plate.

After the passage of 60 cu. m. of gas through the purifying solution at a rate of flow of 20 cu. m. per hour, i.e. during 3 hours, the content of impurities in the gas has become at the outlet:

$O_2$ -------------------- <0.5 part per million (below the limit of sensitivity).
$CO$ -------------------- <1 part per million (below the limit of sensitivity).
$NH_3$ -------------------- 0.4%.

The presence of entrained ammonia being undesirable for the polymerisation reaction, the ethylene is freed therefrom by passing the gas through molten potassium at 150° C., which effects the conversion of the ammonia into potassium amide, which can then be re-used in the purification solution.

EXAMPLE 2

Elimination of oxygen, carbon monoxide, carbon dioxide, and water from a mixture of $(N_2+3H_2)$ intended for the synthesis of ammonia.

An ammonia synthesis gas containing as impurities:

$O_2$ ---------------------------- parts per million-- 17
$CO+CO_2$ ------------------------------ do---- 12
$H_2O$ ---------------------------- mg. per cu. m-- 5 is treated.

This gas, compressed to 500 kg. per sq. cm. is introduced at a temperature of −20° C. at the base of a tubular reactor of an inside diameter of 40 mm., and dispersed by a fritted iron plate (holes of 40 microns) of a diameter of 35 mm.; the volume of purification solution, consisting of 1% by weight of potassium amide in ammonia is 600 cc. The rate of flow of the gas is 25 cu. m. per hour.

After the passage of 50 cu. m., i.e. 2 hours, the contents of impurities in the gas have become at the outlet:

$O_2$ ---------------------------- part per million-- <1
$CO+CO_2$ ------------------------------ do---- <1
$H_2O$ ---------------------------- mg. per cu. m-- <0.5

The following examples illustrate the effectiveness of the process in the elimination of the various impurities considered, in dependence on the variable conditions encountered. All these tests were carried out with an impure ammonia synthesis gas.

EXAMPLE 3

Elimination of Oxygen (A) INFLUENCE OF PRESSURE

The conditions of the test are: rate of flow 25 cu. m. per hour; temperature −40° C.; dispersion through a fritted plate with holes of $40\mu$ in 700 cc. of solution at 1% of $NH_2K$ in ammonia. The results are as follows:

| Pressure (kg./sq.cm.) | $O_2$ content (parts per million) | | Efficiency, percent |
|---|---|---|---|
| | Inlet | Outlet | |
| 1 | 16±0.5 | 15 ±0.5 | 0 |
| 50 | 16±0.5 | 6.4±0.5 | 60±4 |
| 100 | 16±0.5 | 3.1±0.5 | 80±4 |
| 500 | 16±0.5 | 1 ±0.5 | 94±4 |

This illustrates the useful range mentioned for the pressure.

(B) INFLUENCE OF TEMPERATURE

The conditions of the test are: rate of flow 3 cu. m. per hour, pressure 500 kg./sq. cm.; dispersion through a plate perforated with holes of 1 mm. in a solution of 1% of $NH_2K$ in $NH_3$. The results are as follows:

| Temperature (°C.) | $O_2$ content (parts per million) | | Efficiency, percent |
|---|---|---|---|
| | Inlet | Outlet | |
| −50 | 11.2 | 1.7 | 85 ±5 |
| −20 | 17.0 | 2.8 | 83.5±4 |
| +20 | 18 | 1.0 | 50 ±4 |

This shows that the efficiency varies relatively little with the temperature.

(C) INFLUENCE OF THE CONCENTRATION OF THE PURIFICATION AGENT

The conditions of the test are: rate of flow 50 cu. m. per hour, pressure 500 kg. per sq. cm.; temperature −50° C.; dispersion through a plate perforated with holes of 1 mm. in a solution of $NH_2K$ in ammonia. The results are:

| $NH_2K$ content (percent by weight) | $O_2$ content (parts per million) | | Efficiency, percent |
|---|---|---|---|
| | Inlet | Outlet | |
| 3.66±0.05 | 18±0.5 | 3.15±0.5 | 82 ±4 |
| 2.1 | 18±0.5 | 3.1 ±0.5 | 82 ±4 |
| 0.81 | 18.5 | 3.6 | 80.5±4 |
| 0.44 | 18 | 3.15 | 82.5±4 |
| 0.2 | 20 | 6.4 | 69 ±5 |
| 0.1 | 18.5 | 17 | 0 |

This shows that the efficiency varies with the concentration, provided that the latter remains above 0.2%.

(D) INFLUENCE OF THE DEGREE OF DISPERSION

The conditions of the test are: rate of flow 25 cu. m./h. pressure 500 kg. per sq. cm.; temperature —50° C.; purifying solution at 4% of $NH_2K$. The results are:

| Nature of the dispersing plate | $O_2$ content (parts per million) | | Efficiency, percent |
|---|---|---|---|
| | Inlet | Outlet | |
| Fritted plate with holes of 40μ | 7 | 0.5±0.5 | 93±7 |
| Perforated plate with holes of 1 mm | 16±0.5 | 3.1±0.5 | 80.5±3 |
| Holes of 2 mm | 13.5 | 5 | 63 ±4 |

This demonstrates the increasing efficiency with the fineness of the dispersion of the gas in the solution.

(E) INFLUENCE OF THE NATURE OF THE PURIFICATION AGENT

Conditions of the test are: rate of flow 50.25 and 3 cu m. per hour; temperature —50° C.; dispersion through a plate with holes of 1 mm. The results are as follows:

| Rate of flow cu. m./h. | Nature of the amide metal | Concentration, percent | $O_2$ content | | Efficiency, percent |
|---|---|---|---|---|---|
| | | | Inlet | Outlet | |
| 50 | K | 1 | 9.7 | 2.1 | 78±6 |
| | Na | 1 | 19.7 | 7.9 | 60±4 |
| 25 | K | 1 | 18.7 | 5.6 | 71±3 |
| | Na | 1 | 14.5 | 7 | 52±5 |
| 3 | K | 1 | 11.2 | 1.7 | 85±5 |
| | Na | 2 | 16 | 4.6 | 71±4 |
| 25 | Na +ClNa | 1 1 | 14.5 | 5.6 | 62±4 |

This shows that potassium amide is slightly more active than sodium amide. Nevertheless the difference in activity is reduced if a solubilising agent is added to sodium amide, for example sodium chloride.

EXAMPLE 4

*Elimination of Water*

Tests similar to those in Example 3 show that water is eliminated with 100% efficiency at any pressure and at any temperature and for any dispersion, even with a plate perforated with holes of 4 mm., with a rate of flow of 50 cu. m. per hour in a volume of 600 cc. of solution at at least 0.2% of one or the other amide in ammonia.

EXAMPLE 5

*Elimination of Carbon Monoxide*

Similar tests to those in Example 3 show that a CO content of the order of 8 parts per million is eliminated with satisfactory efficiency and practically completely (95%) with a regulation of the variables at the optimum values already mentioned, that is to say pressure of the order of 500 kg. per sq. cm., concentration of at least 0.2% of amide, fritted plate.

From all the aforegoing it follows that a gas charged with the impurities mentioned and subjected to the purification process according to the invention is simultaneously freed of all these impurities, to such an extent that the latter are no longer present with a content which can be discovered by usual dosing methods.

It is to be noted that by "p.p.m." it was desired to designate "parts per million", that is to say cc. per cu. m.; by "efficiency" there was expressed the ratio in percent between the number of parts per million disappeared and the number of parts per million in the inlet gas, brought to 100; finally the percent content of the purification solution expressed the number of grams of amide contained in 100 cc. of liquid ammonia, brought to —60° C. (density =0.7).

We claim:
1. Process for the removal of oxygen, carbon monoxide, carbon dioxide and water as impurities from gaseous mixtures, consisting of contacting the gaseous mixture with a solution of at least one alkali metal amide in liquid ammonia at a temperature between approximately —70° C. to 100° C. and under a pressure between approximately 50 kg./cm.$^2$ and 500 kg./cm.$^2$.

2. Process as in claim 1; wherein the amount of said alkali metal amide in said solution is at least 0.2%, by weight, of the amount of said ammonia.

3. Process as in claim 2; wherein said alkali metal amide is selected from the group consisting of potassium amide and sodium amide.

4. Process as in claim 2; wherein said amount of the alkali metal amide is, at the most, 4.0%, by weight, of said amount of ammonia.

5. Process as in claim 2; wherein ammonia entrained by the gaseous mixture is recovered by cooling the latter to —70° C.

6. Process as in claim 2; wherein the gaseous mixture is a mixture of hydrogen and nitrogen intended for use in the synthesis of ammonia.

7. Process as in claim 2; wherein the gaseous mixture is impure ethylene intended for polymerisation into polyethylene.

References Cited in the file of this patent
UNITED STATES PATENTS 1,685,733    Uhde _____ Sept. 25, 1928